March 11, 1924.
T. G. FERNO
1,486,424
AUXILIARY VEHICLE TOP
Filed June 6, 1922
2 Sheets-Sheet 1
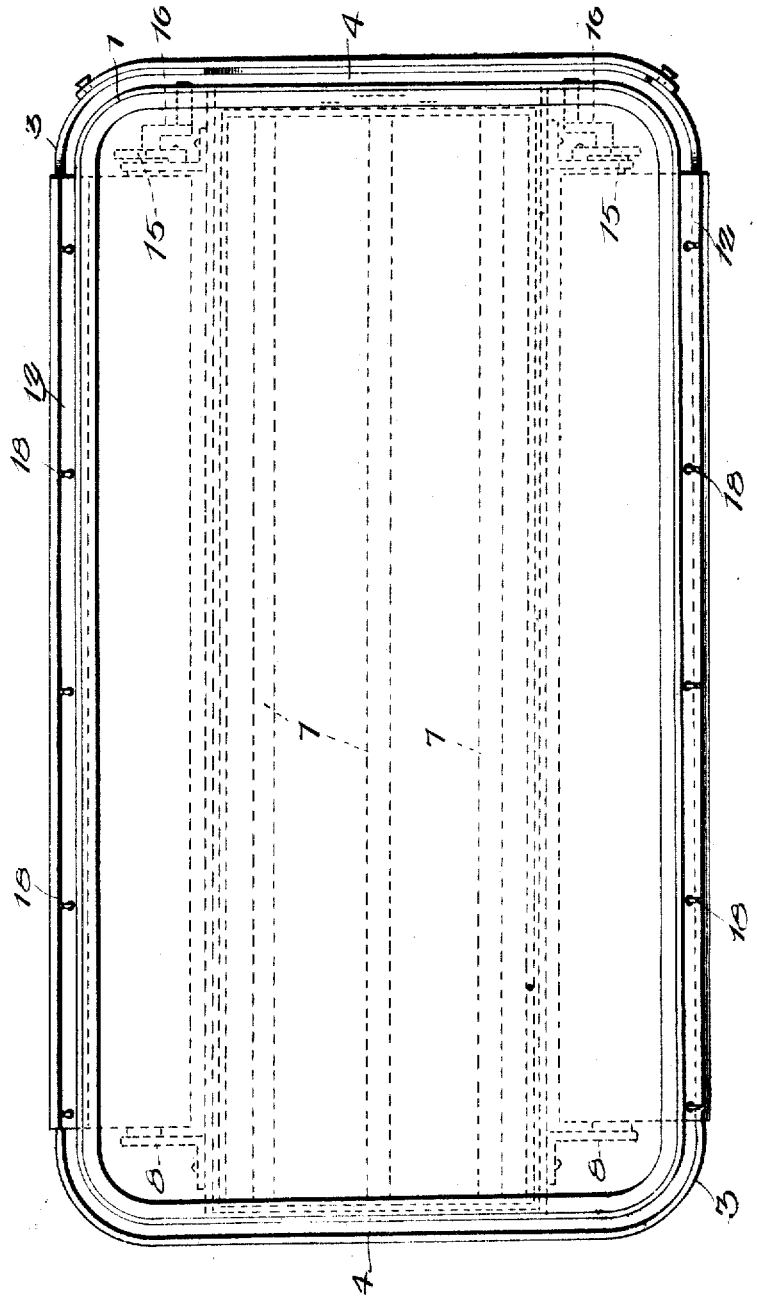

March 11, 1924.
T. G. FERNO
1,486,424
AUXILIARY VEHICLE TOP
Filed June 6, 1922
2 Sheets-Sheet 2
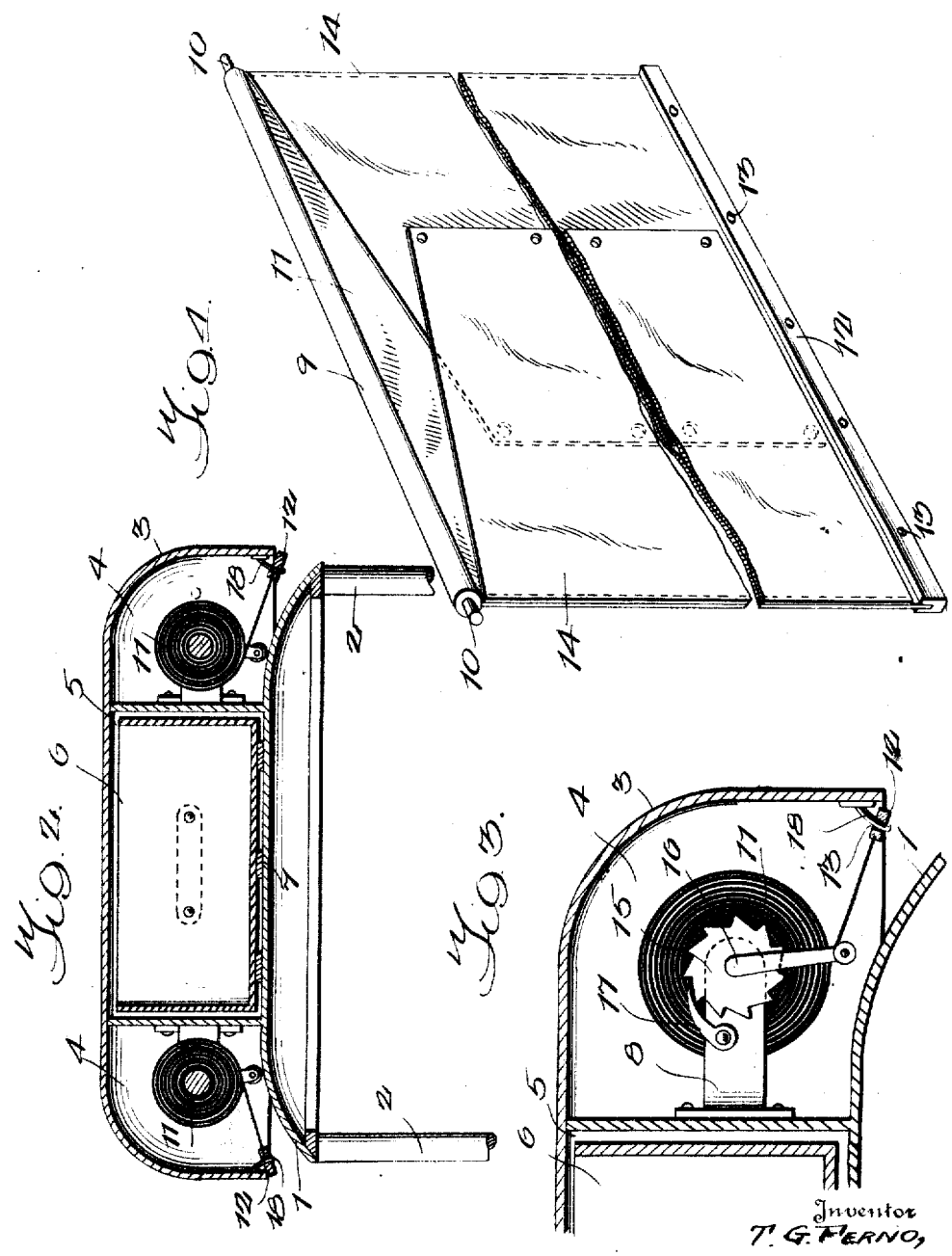

Patented Mar. 11, 1924.

1,486,424

UNITED STATES PATENT OFFICE.

THEODORE G. FERNO, OF DINES, WYOMING.

AUXILIARY VEHICLE TOP.

Application filed June 6, 1922. Serial No. 566,323.

*To all whom it may concern:*

Be it known that I, THEODORE G. FERNO, a citizen of the United States, residing at Dines, in the county of Sweetwater and State of Wyoming, have invented certain new and useful Improvements in an Auxiliary Vehicle Top, of which the following is a specification.

The present invention relates to an auxiliary vehicle top especially useful for automobiles and the like and has for its principal object to provide a top of this nature which is provided with means for supporting side curtains in such a manner that the side curtains may readily be placed in use or held out of use as may be desired.

Another important object of the invention is to provide an auxiliary top of this nature which will be simple and efficient in construction, reliable in operation, comparatively inexpensive to manufacture, and well adapted to the purpose for which it is designed.

With the above and numerous other important objects in view as will appear as the description progresses, the invention resides in certain novel features of construction and the combination and arrangement of parts as will be hereinafter more fully described and claimed.

In the drawing:—

Figure 1 is a bottom plan of a vehicle top embodying my invention,

Figure 2 is a transverse vertical section therethrough,

Figure 3 is an enlarged fragmentary transverse section therethrough showing the curtain and operating mechanism therefor in end elevation, and Figure 4 is a fragmentary perspective of one of the curtains.

Referring to the drawing in detail it will be seen that 1 designates the main top which is supported on standards 2 which may be suitably attached to a vehicle. The auxiliary top 3 is in the form of a casing open at its bottom and formed in three horizontally extending compartments namely the two side compartments 4 and the central compartment 5. A drawer of suitable construction 6 is slidably mounted in the compartment 5 and is adapted to ride on the runners 7 which extend longitudinally of the main top 1. A pair of curtain brackets 8 are fixed in each of the side compartments 4 so as to rotatably support the curtain roller 9 which has its reduced end 10 journalled in these brackets. A curtain 11 is fixed at one end in any suitable manner to the roller 9 and on its other end has fixed thereto a rod 12 which is provided with a plurality of apertures 13. This curtain 11 is provided with the foldable side flaps 14 which are adapted to be brought about the ends of the vehicle and attached to corresponding side flaps on the other curtain.

As is shown to advantage in Figure 3 a ratchet wheel 15 is keyed to one end of each of the rollers 9 and is rotated by a crank 16 so that the curtain may be wound about the roller 9. A dog 17 pivoted on one of the brackets 8 is engageable with the ratchet wheel 15 so as to prevent the binding of the curtain. When the curtain is almost completely wound about its roller 9 the rod 12 is positioned so that its apertures 13 receive the pins 18 which extend from the edge of the compartments 4. The curtain may then be tightly wound about the roller and the dog will engage a proper tooth on the ratchet wheel 15 so as to prevent the unwinding thereof and thus the various parts of the mechanism may be held rigid so as to prevent any rattling or the like.

It is thought that the operation and construction of the invention will now be readily understood without a more extended explanation. It is desired, however, to point out that the present showing of the invention has merely been disclosed by way of example and that numerous changes in construction, and in the combination and arrangement of parts may be resorted to without departing from the spirit of the invention as hereinafter claimed.

Having thus described my invention what I claim as new is:—

1. In combination, a vehicle top including a main top and an auxiliary top mounted thereon and spaced there above, partitions supporting the auxiliary top above the main top for forming compartments, vehicle side curtains, and rollers in said compartments and mounted on said partitions for supporting said side compartments.

2. In combination, a vehicle top including a main top curved downwardly adjacent its longitudinal side edges, a pair of partitions rising from the main top one on each side of its longitudinal center, an auxiliary top supported by said partition above the main top and being curved downwardly adjacent its longitudinal side edges so as to form side walls whereby compartments are formed between said side walls and said partitions, rollers in said compartments, brackets on said partitions for supporting said rollers and vehicle side curtains supported on said rollers.

In testimony whereof I affix my signature in presence of two witnesses.

THEODORE G. FERNO.

Witnesses:
C. M. BROWN,
J. W. POSTLEWAITE.